Aug. 31, 1954   S. P. J. KEINÄNEN   2,687,759
ANTISKID MEANS
Filed July 28, 1950   3 Sheets-Sheet 1
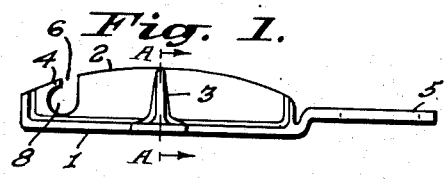
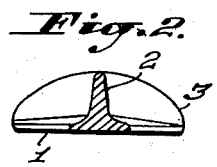
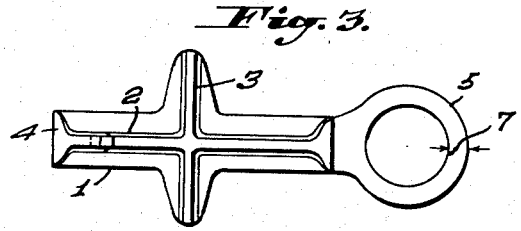
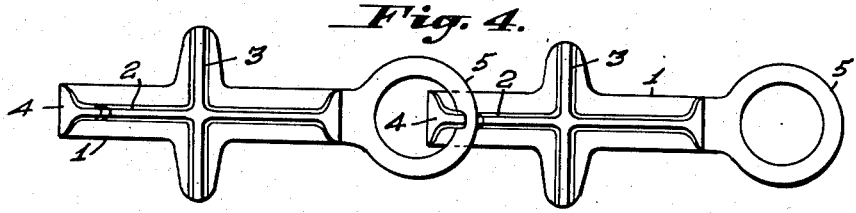
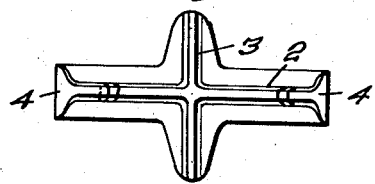
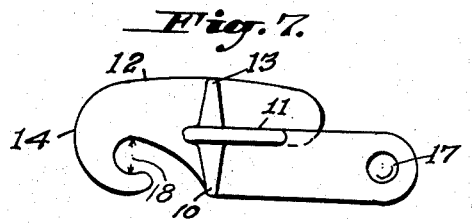
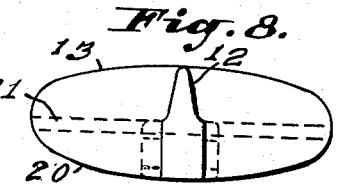
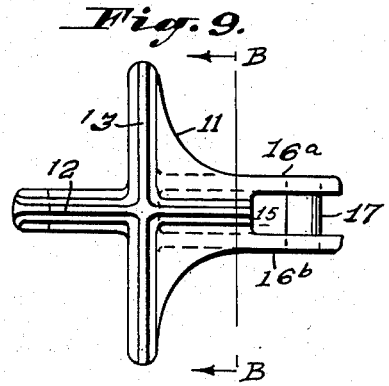
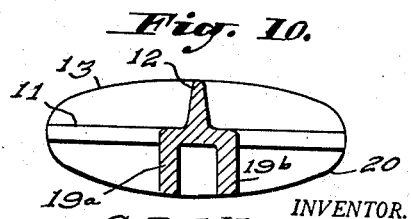
INVENTOR.
S. P. J. Keinänen
BY
Elsworth Downing Reebold
Attorneys.

Aug. 31, 1954     S. P. J. KEINÄNEN     2,687,759
ANTISKID MEANS
Filed July 28, 1950     3 Sheets-Sheet 2
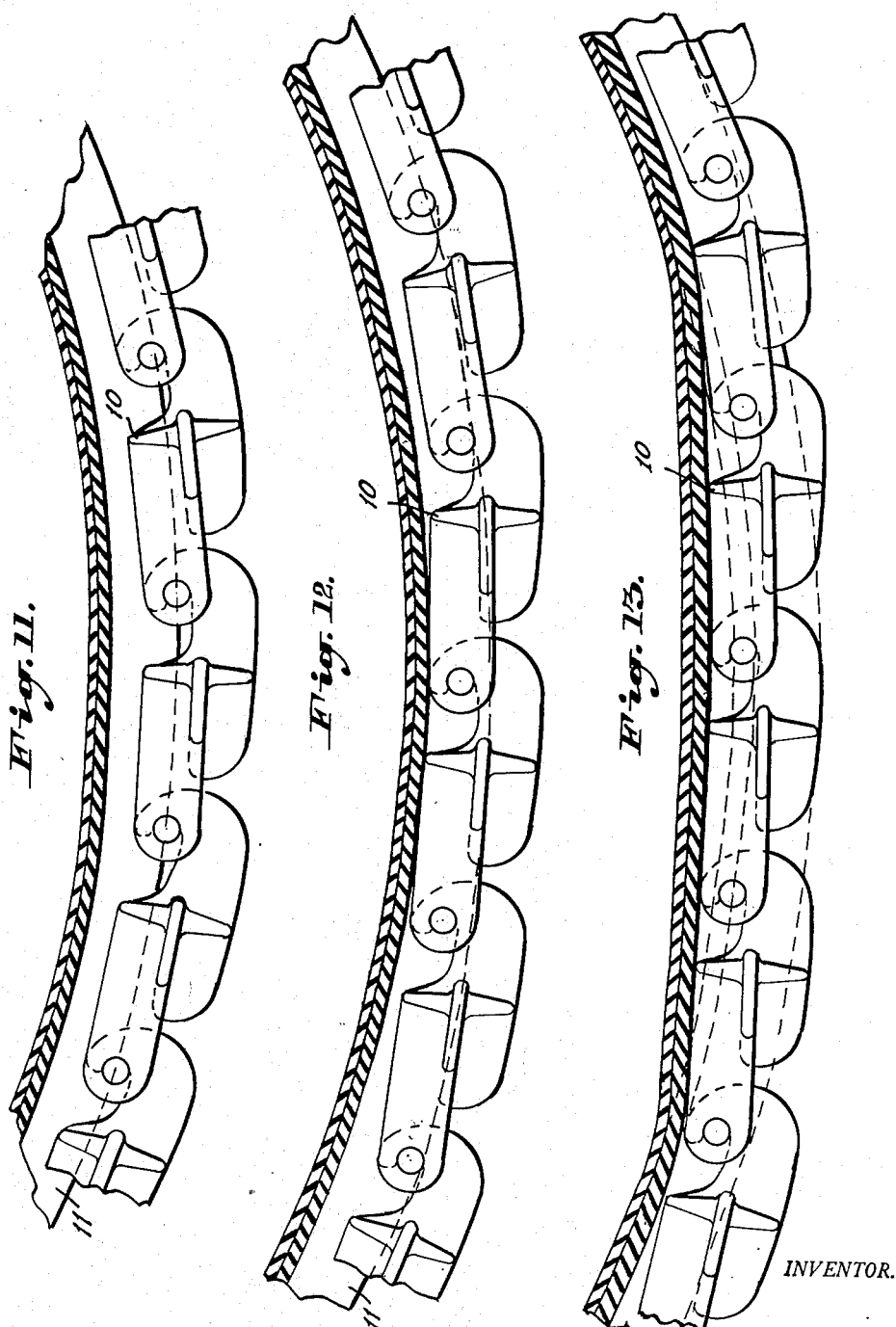
INVENTOR.
S.P.J. Keinänen
By Hancock Downing Seebold
Attorneys.

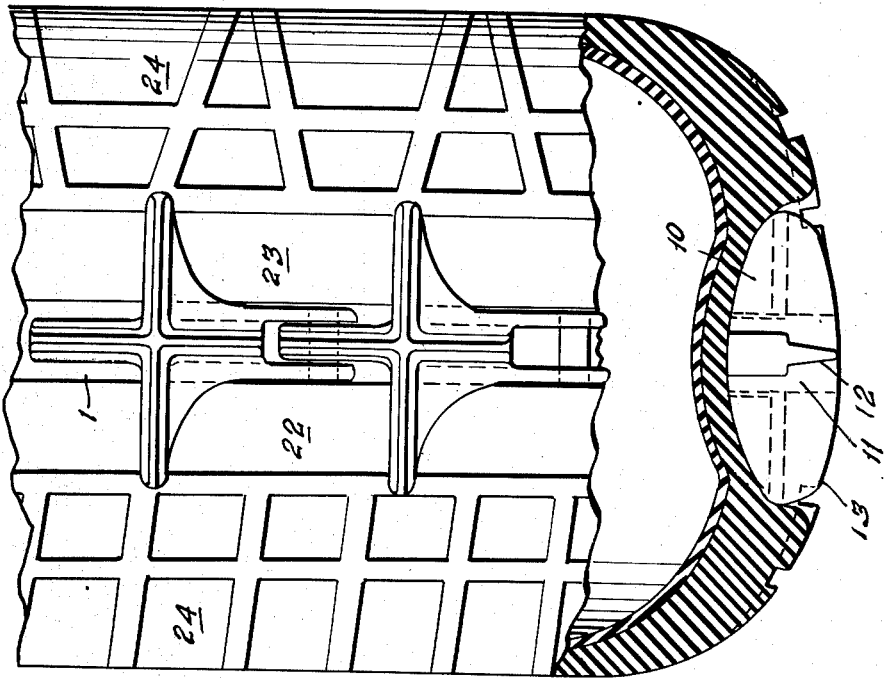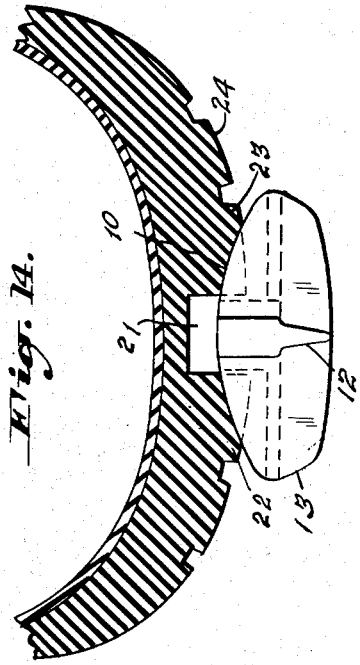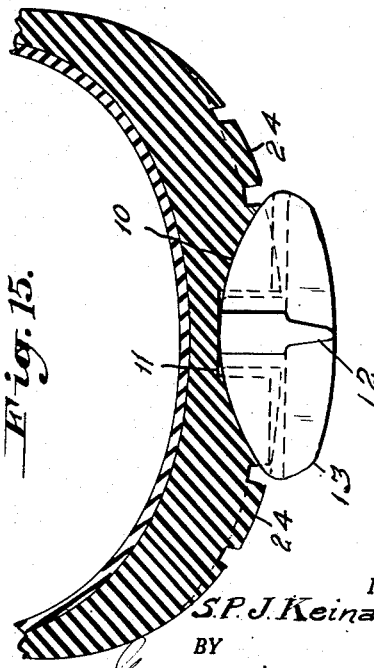

Patented Aug. 31, 1954

2,687,759

UNITED STATES PATENT OFFICE 2,687,759

ANTISKID MEANS

Sulo Paavo Johannes Keinänen, Helsinki, Finland

Application July 28, 1950, Serial No. 176,418

4 Claims. (Cl. 152—191)

The present invention relates to improvements in tires of the pneumatic type and it is the primary object of the invention to provide a tire of improved anti-skid properties, particularly on slippery and icy surfaces and the like.

The invention contemplates the provision of anti-skid means as used on vehicle tires and of the type comprising a plurality of interconnected links which when mounted in proper position on the tire lie against the outer peripheral surface thereof.

Practice has shown that a non-skid device if formed to have a smooth tread-contacting surface will not stay in place but tends to slide on the tire. This sliding motion places the links of the device under tensile stresses which ultimately break the non-skid device. It has been observed that when a vehicle is driven over a road the vehicle weight on a road-contacting link of the non-skid device will cause the link to sink more or less deeply into the road surface depending on the hardness of the road. Then the link "bites" into the road surface preventing skidding. Because of the kinetic energy of a vehicle in motion the tire will tend to slide in respect to the smooth surface of the link and because such a surface is incapable of preventing this motion, it follows that the link will slide slightly backward on the tire. This motion repeats itself for each subsequent link. As this continues, the result will be that the whole non-skid device is gradually caused to move on the tire surface. The tensile stress produced may increase to the extent that the non-skid device breaks.

One of the purposes of the present invention is to overcome this objectionable feature of the non-skid devices heretofore employed. This is accomplished, in accordance with the present invention, by forming each link of the non-skid device with a transverse rib extending from the link toward the tread of the tire, and adapted to sink partly into the tread surface at least under maximum loading. This transverse rib causes a rocking motion of the link, and thus obviates tensile stresses and prevents the tire from slipping relative to the link.

In the following, some embodiments of the invention will be described with reference to the accompanying drawings, in which:

Fig. 1 is a side elevation of a link according to one embodiment of the present invention, while Fig. 2 is a cross-section along line A—A of Fig. 1, Fig. 3 is a plan view thereof, and Fig. 4 a plan view showing two of the links illustrated in Figs. 1-3 as coupled to each other.

Fig. 5 is a side elevation of a link according to a second embodiment of the invention, and Fig. 6 is a plan view thereof.

Fig. 7 is a side elevation of a link according to a third embodiment of the invention, while Fig. 8 is an end view thereof, and Fig. 9 a plan view thereof.

Fig. 10 is a section taken along line B—B of Fig. 9.

Fig. 11 shows how the interconnected links according to the present invention arrange themselves with respect to the tire when run over a road surface that is soft, e. g. covered by snow.

Fig. 12 is similar to Fig. 11 showing the road surface as hard, e. g. covered by ice.

Fig. 13 shows how the links arrange themselves when run over a hard road, e. g. of concrete.

Fig. 14 is similar to Fig. 11 but shows a cross-section thereof.

Fig. 15 is similar to Fig. 12 but shows a cross-section thereof.

Fig. 16 illustrates links as coupled to each other and mounted on a tire, the tire being shown partly in section.

Referring to Figs. 1-4 the links comprise an elongated bottom-plate 1 having a longitudinal rib 2 and a transverse rib 3. One end of the longitudinal rib 2 is shaped into a hook 4 and the other end into a ring 5. The material thickness of the ring 5 approximately corresponds to the breadth of the opening 6 of the hook 4 and the ring breadth 7 approximately corresponds to the breadth of the hook cavity 8. The hook 4 and ring 5 are constructed so that on interconnecting the links into the position shown in Fig. 4 the ring 5 must first be forced into the hook opening 6 by arranging the links to be interconnected transversely of each other and only after this has been done by turning them into longitudinal engagement.

Referring to Figs. 5 and 6, the link has a hook 4 at both ends thereof.

In Fig. 7 the reference numeral 11 designates the bottom-plate of the link. The said bottom-plate 11 need not necessarily extend over the whole length and breadth of the link but may be made only so wide as to efficiently strengthen the various parts of the link. Should the various parts of the link element be made otherwise sufficiently strong the parts corresponding to the bottom-plate can be totally eliminated. For the sake of clearness, however, the bottom-plate will be referred to in both of these paragraphs as well as in the one following. The top part of the bottom-plate 11 is provided with a longitudinal rib 12 or so-called guide rib and transversely of the said guide rib is arranged a rib 13 or so-called traction and brake rib. In this instance one end of the rib 12 is shaped into a hook 14 which extends slightly below the bottom-plate 11, as it is clearly shown in Fig. 7. The ring 5 shown in Figs. 1–4 is in this embodiment substituted by a fork 15, the legs of which are designated by the reference numerals 16a and 16b. The distance between the legs 16a and 16b is slightly greater than the thickness of the hook 14 so that the fork 15 can accommodate the hook 14. A pin 17 provided for connecting the ends of legs 16a and 16b can either be fixed or detachable. The thickness of the pin 17 corresponds approximately to the diameter of the cavity 18 of the hook 14. The axis of the pin 17 is located as much below the bottom-plate 11 as the centre point of the cavity 18 of the hook 14. It is to be understood that a hook for fastening the link can be substituted by an aperture for receiving the pin 17. Moreover, underneath the bottom-plate 11 are provided two ribs 19a and 19b, as clearly shown in Fig. 10. These ribs are provided for the purpose of making the link as strong and light in construction as possible. Obviously even one rib will do, and more than two ribs can also be used.

The anti-skid means according to the invention can be further developed by providing a rib 20 disposed transversely of the ribs 19a and 19b and located underneath the bottom-plate 11.

As is evident from Figs. 14–16, the rubber tire is made so that there is formed in the central portion thereof an endless groove 21 or a series of longitudinal recesses for receiving the longitudinal portions underneath the bottom-plate of the link. Advantageously the groove 21 is of sufficient depth to retain therein the inserted portion of the link without the same contacting the groove bottom—except possibly under maximum loading conditions.

On either side of the groove 21 or longitudinal recesses corresponding thereto are advantageously provided continuous circumferential tread surface portions 22 and 23 having a width approximately equal to the width of the link which extends from the sides of the groove 21. The said tread surface portions 22 and 23 and/or the outer circumferential parts of the tire are advantageously provided with grooves, which form various surface designs 24, which assist in preventing skidding.

The links according to the invention are interconnected to form a continuous chain in the manner shown in Figs. 11–13 and 16.

The operation of the anti-skid means is as follows:

When the chain of links is tightened around the tire, the longitudinal portion of each link is located totally or in part in the endless circumferential groove or in the series of recesses corresponding thereto while the transverse portion rests against the tire tread surface on the sides of the groove recess.

Then, should the road surface be soft, e. g. covered by snow (Fig. 11), the part of the link protruding from the tire tread surface penetrates or "bites" completely into the road. Consequently it is as though the link "shovels" the encountered road surface thus serving as efficient means for non-slipping.

When a vehicle is run on a hard surface, e. g. on an ice-covered road (Fig. 12), the load on the links increases and consequently the links penetrate partly into the road surface and partly into the tire tread surface.

When driven over an exceptionally hard road, e. g. a concrete laid road (Fig. 13), the links sink completely into the tire in consequence of the resilience characteristic of pneumatic tires, as is also the case when a tire of the kind described encounters and rolls over localized elevations protruding from the road surface (softness etc.).

It is to be noted that the vehicle weight will, regardless of the type of the road surface, rest on the tire tread surface as is also the case on employing a tire without the anti-skid means made according to the present invention.

It is to be understood that the accompanying drawings and the descriptions referring thereto have been given solely for the purpose of illustrating the inventive concept. This applies especially to the shape of the link and particularly to that portion which operates against the road surface. In the embodiments shown in Figs. 1–10 the longitudinal rib which prevents lateral skidding and guides vehicle movement, and the traction and braking improving rib transversely disposed of the said first mentioned rib together form a cross-like figure. This need not necessarily be the case for the principal idea is that the link is provided with one or more transverse ribs and one or more longitudinal ribs. In addition to the cross-like figure these ribs can be arranged to form the figure T or the figure H, or they can be quite apart from each other.

Obviously the anti-skidding means can also comprise two or more interconnected or two or more separate chains of links.

The link as a whole can be made according to the invention so that it can as such be adopted for use with heretofore known tires. The link, however, can also be designed as efficient as possible without the slightest regard to known tread surface designs, in which case the tire tread surface is made so as to conform to the constructionally best possible link.

What is claimed is:

1. An antiskid device for a pneumatic tire having a circumferential groove formed in its tread, comprising a plurality of similarly constructed rigid link elements joined to form an endless chain, each link including a plate, a longitudinal rib thereon and a transverse rib on the plate, said ribs extending outwardly from said plate relative to the tire, a second transverse rib extending inwardly from said plate relative to the tire, having a length greater than the width of said groove, a second longitudinal rib extending inwardly from said plate relative to the tire having a thickness less than the width of said groove and a height less than the depth of the said groove.

2. An antiskid device for a pneumatic tire having a circumferential groove formed in its tread, comprising a plurality of similarly constructed rigid link elements joined to form an endless chain, each link including a plate, a longitudinal rib thereon, the end of which is shaped to form a hook, a transverse rib on the plate, said ribs extending outwardly from said plate relative to the tire, a second transverse rib extending inwardly from said plate relative to the tire having a length greater than the width of said groove, a second longitudinal rib extending inwardly from said plate relative to the tire having a thickness less than the width of said groove and a height less than the depth of the said groove, the end of said second longitudinal rib being shaped to a ring for engaging the hook of a subsequent link of the chain.

3. An antiskid device for a pneumatic tire having a circumferential groove formed in its tread, comprising a plurality of similarly constructed rigid link elements joined to form an endless chain, each link including a plate, a longitudinal rib thereon, the end of which is shaped to form a ring, a transverse rib on the plate, said ribs extending outwardly from said plate relative to the tire, a second transverse rib extending inwardly from said plate relative to the tire having a length greater than the width of said groove, a second longitudinal rib extending inwardly from said plate relative to the tire having a thickness less than the width of said groove and a height less than the depth of the said groove, the end of this second longitudinal rib being shaped to form a hook for engaging the ring of a subsequent link of the chain.

4. An antiskid device for a pneumatic tire having a circumferential groove formed in its tread, comprising a plurality of similarly constructed rigid link elements joined to form an endless chain, each link including a plate, a longitudinal rib thereon, a transverse rib on the plate, said ribs extending outwardly from said plate relative to the tire, a second transverse rib extending inwardly from said plate relative to the tire having a length greater than the width of said groove, a second longitudinal rib extending inwardly from said plate relative to the tire having a thickness less than the width of said groove and a height less than the depth of the said groove, the said second longitudinal rib having one end shaped to form a hook and its other end shaped to form a fork, each of said links being provided with a pin mounted in said fork transversely, for engaging the hook of a subsequent link of the chain.

References Cited in the file of this patent

UNITED STATES PATENTS

| Number | Name | Date |
|---|---|---|
| 802,005 | Lyon | Oct. 17, 1905 |
| 958,748 | LaDriere | May 24, 1910 |
| 1,054,980 | Morgan | Mar. 4, 1913 |
| 1,258,863 | Brown | Mar. 12, 1918 |
| 1,270,550 | Poling | June 25, 1918 |
| 1,279,385 | Mcauley | Sept. 17, 1918 |
| 1,334,110 | Moriarty | Mar. 16, 1920 |
| 1,517,766 | Torzewski | Dec. 2, 1924 |
| 1,609,464 | Compton | Dec. 7, 1926 |
| 1,848,444 | Tully | Mar. 8, 1932 |
| 2,276,640 | Ansel | Mar. 17, 1942 |
| 2,441,656 | Ansel | May 18, 1948 |